Aug. 15, 1950        W. I. GEIGER        2,518,611
DEVICE FOR OBTAINING POWER FROM MOVING FLUID
Filed Nov. 20, 1947        2 Sheets-Sheet 1
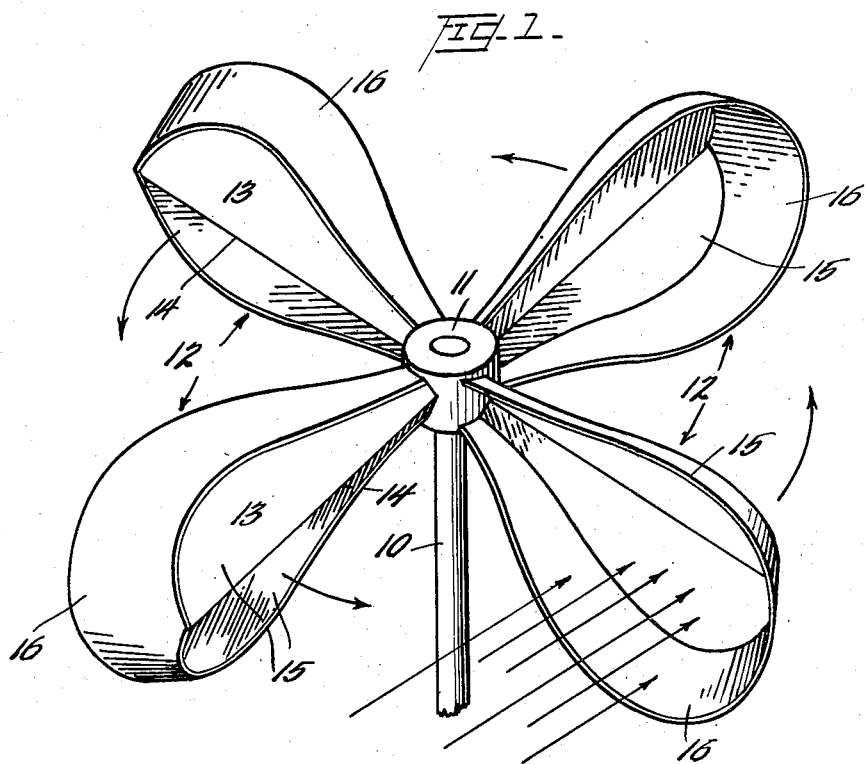
INVENTOR:
WILLIAM I. GEIGER
BY:
ATTORNEY

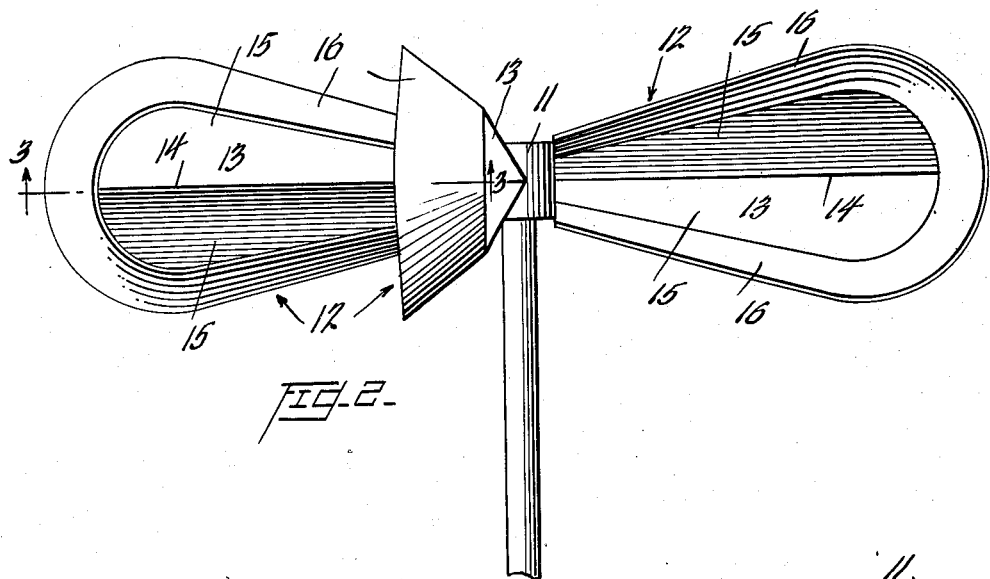
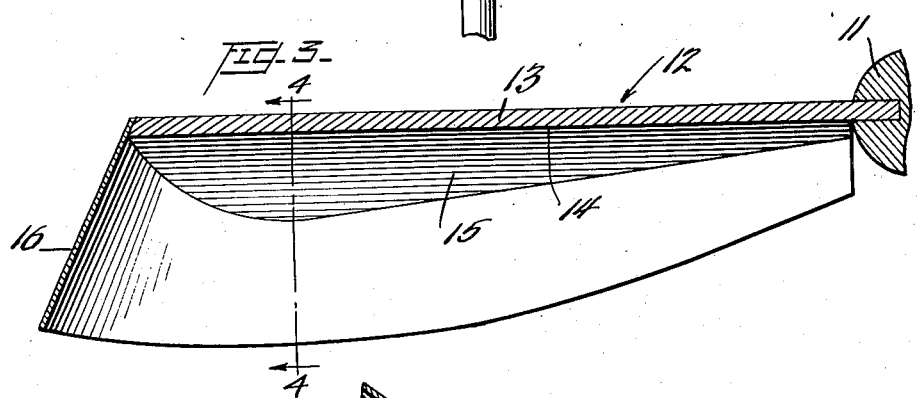
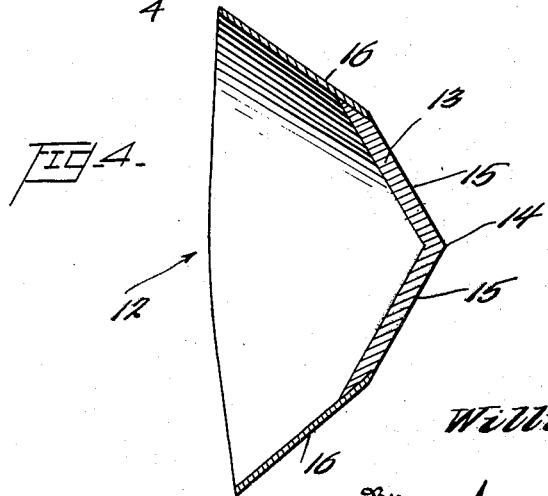

Patented Aug. 15, 1950

2,518,611

UNITED STATES PATENT OFFICE 2,518,611

DEVICE FOR OBTAINING POWER FROM MOVING FLUID

William I. Geiger, Jacksonville, Fla.

Application November 20, 1947, Serial No. 787,051

5 Claims. (Cl. 170—36)

This invention relates to devices for obtaining power from moving fluid. Furthermore it relates to a special form of vane and arrangement of such vanes.

The invention is of the general type known as anemometers and the principal object of the invention is to improve the vane shape and construction in devices of that character.

In the ordinary anemometer, such as is used for determining wind velocities, the several hemispherical cups are used on arms which radiate from a central shaft. The wind is caught in the hollow of the cup and the device revolves, bringing the convex side of the cup into the wind and checking the movement.

It is an object of this invention to provide cups of such shape they will the better catch the wind or other moving fluid and will have less resistance to the wind when moving with the convex side thereagainst.

A further object of the invention is to provide a device of this character having a solid and firm main portion and a thinner and lighter peripherical portion.

With the above and other objects in view, the invention consists, in general, of certain novel details of construction and combinations of parts hereinafter fully described, illustrated in the accompanying drawings, and particularly claimed.

In the accompanying drawings, like characters of reference indicate like parts in the several views, and:

Figure 1 is a perspective view of the invention.

Figure 2 is a side elevation thereof.

Figure 3 is a section on the line 3—3 of Figure 2.

Figure 4 is a section on the line 4—4 of Figure 3.

In carrying out this invention, there is provided a shaft 10 having at its end a hub 11, wherefrom radiate certain vanes, each indicated in general at 12. It is the shape of these vanes upon which this invention resides. These vanes each have a heavy bottom or main portion 13 of cymbiform shape, but this cymbiform shape is provided with a keel 14 so that the keel, extending longitudinally, provides a pair of inclined sides 15. These sides are continued by a thin flange 16. The vanes are substantially open at the hub 11 and widen out from that point so that the cymbiform shape is widest and deepest, as shown in Figure 3, at its outer end.

By reason of this construction, the wind striking the device flows outward and catches in the wide outer end of the cymbiform vane and thereby, with the greater leverage at this part of the vane, exerts more power than the usual small cup on the ordinary anemometer. The device is thus adapted not merely for a wind speed registering instrument, but for the production of power with special attention to the exertion of the power on the long radius while at the same time giving good support throughout.

Furthermore, the keel 14 splits the wind when the vane is moving against the wind, with the keel taking the force of the wind. This makes for the vanes having a low resistance when moving backwards against the wind.

Another point is that with the thin flange or outer portion 16, some yielding is permitted in heavy blows or heavy moving of fluids so that when there is an excess of pressure of wind or other fluid, a certain amount of escape is permitted.

Under ordinary circumstances, when air is used as the propellant the shaft 10 is placed in vertical position but when the device is used in water, the shaft 10 is placed in horizontal position just above the water so that the flow of a rapid stream will act on the vanes very much in the same way as air acts on them when air is the propellant. The energy produced may be used to operate a motor generator set and in this manner air power may be converted into electrical energy.

The present power producing device may be installed in or adjacent a city or country home and may furnish power for pumping water or air conditioning without the use of fuel oil or any similar energy producing material.

A plurality of the air wheels of the present power producing device may be attached to an automobile, truck, or even to a railroad train and sufficient air power may be generated to drive a motor generator set and thereby produce sufficient direct current to operate without the use of gasoline.

In more specific form, the present invention is directed to a power producing device, comprising a shaft and cymbiform vanes radiating from the shaft, said vanes comprising a relatively heavy and stiff body portion and a relatively light and partially flexible peripherical or peripheral portion. The cymbiform vanes radiating from the shaft may have their outer ends wider and deeper than the inner ends. The cymbiform vanes are provided with a bluntly sharpened keel on the rear side thereof.

The vanes may be made of metal, such as iron, steel, aluminum, Monel metal, which is non-rustable, brass, metal alloys, and the like. The vanes may be made of plywood bound together by a non-oxidizable binder, or the device may be made of a plastic material of which several known materials are on the market.

While I have disclosed the preferred embodiments of my invention, changes may be made in the construction and arrangement of the parts of my invention without departing from the spirit thereof, and it is my intention to cover in the attached claims any modified forms or structures or the use of mechanical equivalents which may be reasonably included within their scope.

What is claimed as new is:

1. In a power producing device, a shaft, cymbiform vanes radiating from the shaft, each of said vanes having a keeled body portion providing a pair of inclined sides arranged at an angle to each other and meeting to form a sharpened keel, each of said sides having extending from its outer edge a flexible peripherical portion thinner than each side of the vane.

2. In a power producing device, a shaft, cymbiform vanes radiating from the shaft, each of said vanes having a keeled body portion providing a pair of inclined sides arranged at an angle to each other and meeting to form a sharpened keel, each of said sides having extending from its outer edge a flexible peripherical portion thinner than each side of the vane, the outer end of each vane being wider and deeper than the inner end thereof.

3. In a power producing device, a shaft, a hub fixed on said shaft, and cymbiform vanes radiating from said shaft, each of said vanes including a rigid and relatively thick body having a narrow inner end fixed to said hub and having a wide outer end arcuate in outline, said body being of shallow V-shape in cross-section throughout its length providing a pair of plane side portions uniformly disposed angularly with respect to each other throughout the length of the body, each of said vanes having a relatively thin edge portion extending around the periphery of the body.

4. In a power producing device, a shaft, a hub fixed on said shaft, and cymbiform vanes radiating from said shaft, each of said vanes including a rigid and relatively thick body having a narrow inner end fixed to said hub and having a wide outer end arcuate in outline, said body being of shallow V-shape in cross-section throughout its length providing a pair of plane side portions uniformly disposed angularly with respect to each other throughout the length of the body, each of said vanes having a relatively thin edge portion extending around the periphery of the body and inclined throughout at an obtuse angle to the planes of said body.

5. In a power producing device, a shaft, a hub fixed on said shaft, and cymbiform vanes radiating from said shaft, each of said vanes including a rigid and relatively thick body having a narrow inner end fixed to said hub and having a wide outer end arcuate in outline, said body being of shallow V-shape in cross-section throughout its length providing a pair of plane side portions uniformly disposed angularly with respect to each other throughout the length of the body, each of said vanes having a relatively thin edge portion extending around the periphery of the body and inclined throughout at an obtuse angle to the planes of said body, said edge portion forming a wall increasing in width from the narrow end of the body to the wide end thereof.

WILLIAM I. GEIGER.

REFERENCES CITED

The following references are of record in the file of this patent:

UNITED STATES PATENTS

| Number | Name | Date |
|---|---|---|
| 303,585 | Morehouse | Aug. 12, 1884 |
| 625,614 | Thompson | May 23, 1899 |
| 1,359,180 | Levesque | Nov. 16, 1920 |
| 1,812,741 | Espinosa | June 30, 1931 |

FOREIGN PATENTS

| Number | Country | Date |
|---|---|---|
| 332,379 | France | Aug. 22, 1903 |